UNITED STATES PATENT OFFICE.

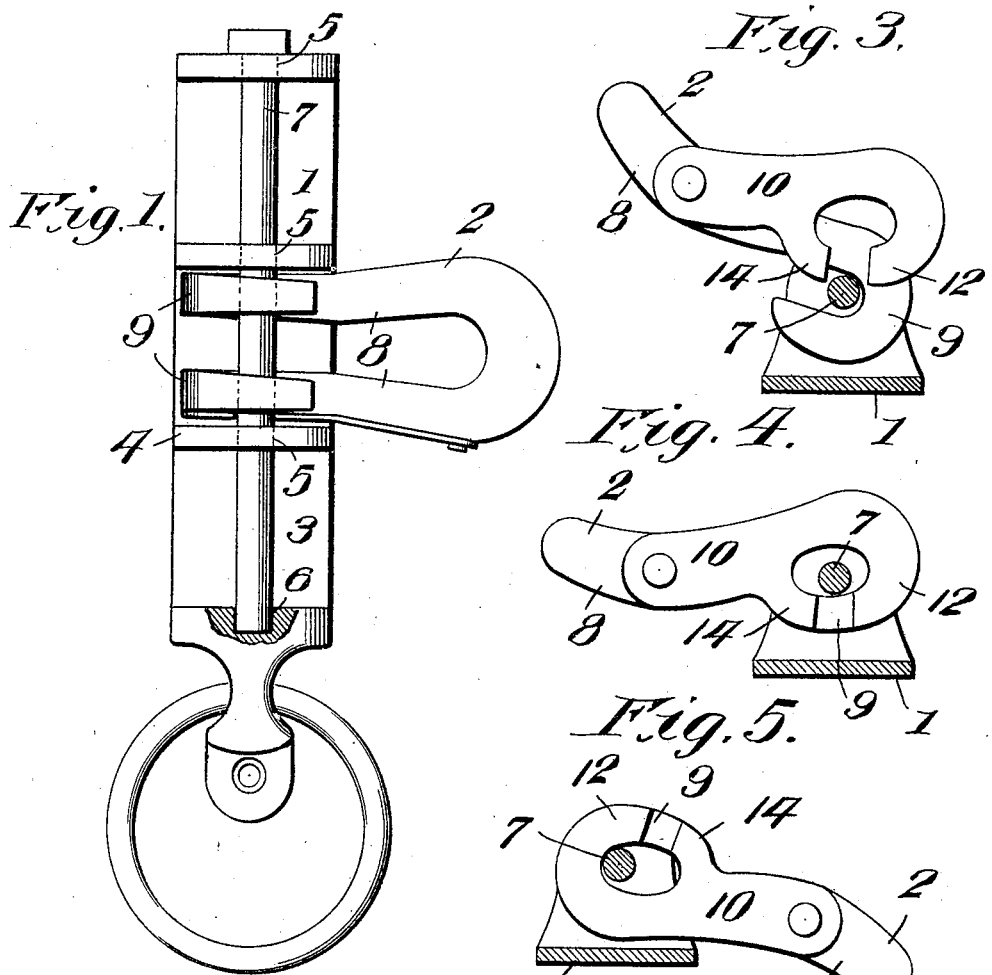

GEORGE F. LINDSAY, OF SHERMAN, TEXAS.

HAME AND TRACE CONNECTOR.

No. 814,222.　　　　Specification of Letters Patent.　　　Patented March 6, 1906.

Application filed July 24, 1905. Serial No. 270,977.

*To all whom it may concern:*

Be it known that I, GEORGE F. LINDSAY, a citizen of the United States, residing at Sherman, in the county of Grayson and State of Texas, have invented certain new and useful Improvements in Hame and Trace Connectors; and I do declare the following to be a full, clear, and exact description of the invention, such as will enable others skilled in the art to which it appertains to make and use the same.

This invention relates to improvements in hame and trace connectors.

The object of the invention is to provide a hame and trace connection having means to prevent the parts of the same from becoming disconnected.

A further object is to provide a keeper-plate for the hook of a hame and trace connection or other devices, whereby said hook will be prevented from becoming casually disconnected from said devices.

With the above and other objects in view the invention consists of certain novel features of construction, combination, and arrangement of parts, as will be hereinafter described and claimed.

In the accompanying drawings, Figure 1 is a side view, partly in section, of a hame and trace connection, showing the application of the invention thereto. Figs. 2, 3, 4, and 5 are horizontal sectional views of the hame member of the connection, showing the manner in which the hook member is engaged therewith and the various positions the keeper-plate assumes while the connection between the hook and hame member is being made; and Fig. 6 is a detail perspective view of the keeper-plate removed from the hook.

Referring more particularly to the drawings, 1 denotes the hame member of the connection, and 2 denotes the trace member or hook. The hame member 1 may be of any suitable construction, but is here shown as consisting of a back plate 3, on which is formed a series of right-angularly-disposed outwardly-projecting lugs 4, which are spaced apart equal distances on said back plate. The upper lugs 4 are provided with alining vertically-disposed apertures 5, which will aline or coincide with a socket 6, formed in the lower lug. Through the alining apertures 5 and the socket 6 is adapted to be inserted a pin or bolt 7.

The trace member or hook 2 of the connection is here shown as a double hook having a bail-shaped shank 8 and parallel inwardly-curved bills 9, which are adapted to be engaged with the bolt or pin 7 between any two of the lugs 4 on said back plate of the hame member. Pivotally connected to the lower side of the hook 2 is a keeper-plate 10. Said keeper-plate extends to the end of the hook and is provided on one edge with a laterally-projecting inwardly-curved lug 12, adapted to be swung across the bill of a hook, thereby closing the same. On the outer end of the keeper-plate 10 is formed a laterally-projecting inwardly-curved lug 14, which extends across the end of the hook, as shown.

In applying the hook to the hame member of the connection the bills of the hook are first engaged with the pin or bolt 7 in the position shown in Fig. 2 of the drawings. The hook is then swung to the position shown in Fig. 3, in which the pin or bolt 7 is shown as seated in the end of the curve of the hook, at which time the keeper-plate is swung across the bills of the hook, as shown in Fig. 4, thereby preventing the disconnection of the hook from the bolt. After the keeper-plate has been thus arranged the hook is swung around on the bolt 7 to an operative position, as shown in Fig. 5 of the drawings, so that when a draft is applied to the hook the bolt 7 will be engaged with the curved outer lug 12 of the keeper-plate, which will prevent the keeper-plate from turning or being moved out of place on the hook, thereby preventing the disengagement of the hook from the hame member of the connection.

Referring to Figs. 2 and 3, it will be seen that when the hook is being engaged with the bolt 7 there is just sufficient room for the bolt to pass between the two lugs 12 14 when the hook 10 is swung outwardly on its pivot. When the hook is swung to the position shown in Figs. 4 and 5, the entrance to the hook 10 is closed between the lugs 12 14 and any movement of the hook upon the bolt 7 could not release the hook from said bolt unless the hook 10 is swung upon its pivot independently of the hook 8.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus described my invention, what I claim as new, and desire to secure by Letters Patent, is—

The herein-described hame and trace fastener consisting of a trace-hook 2 having the parallel hooks 8, 9, a keeper-plate or hook 10 having an opening therein and provided with oppositely-disposed lugs 12, 14, adapted to be closed by the bill of the trace-hook and held in locked position when in operative position, in combination with a hame-plate 1 having a series of lugs 5 projecting therefrom and a vertical pin or bolt 7 passing through holes in said lug, said pin being located at such distance from the plate 1 as to hold the keeper-plate in locked condition when the lugs 12, 14, are outward, essentially as described.

In testimony whereof I have hereunto set my hand in presence of two subscribing witnesses.

GEORGE F. LINDSAY.

Witnesses:
W. R. BRANTS,
A. C. SANDERS.